United States Patent [19]

Siems

[11] 4,106,592
[45] Aug. 15, 1978

[54] ROD OILER ASSEMBLY

[75] Inventor: Gerald Eugene Siems, Davenport, Iowa

[73] Assignee: J. I. Case Company, Racine, Wis.

[21] Appl. No.: 797,614

[22] Filed: May 17, 1977

[51] Int. Cl.² ............................................. F16N 7/12
[52] U.S. Cl. ........................................ 184/25; 277/20
[58] Field of Search ..................... 184/24, 25, 22, 102; 188/322; 308/5 R, 3.5; 277/19, 20

[56] References Cited

U.S. PATENT DOCUMENTS

| 470,397 | 3/1892 | Jerome | 184/25 |
|---|---|---|---|
| 512,166 | 1/1894 | Devine | 184/25 |
| 694,840 | 3/1902 | Dauphin | 184/25 |
| 730,381 | 6/1903 | Maddox | 277/20 |
| 778,848 | 1/1905 | Elliott | 184/25 |
| 897,448 | 9/1908 | Blake | 184/25 |
| 986,029 | 3/1911 | Steinert | 184/25 |
| 1,460,174 | 6/1923 | Price | 184/25 X |

Primary Examiner—David H. Brown

Attorney, Agent, or Firm—Arthur J. Hansmann

[57] ABSTRACT

A rod oiler assembly for oiling the piston rod of a cylinder assembly which presents a surface against which a lubricant impregnated material is retained by a removable housing. The lubricant-presenting member surrounds the piston rod and lubricates the rod when the rod moves relative to the cylinder itself, and thus rust and dirt and the like are combated by normal extension and contraction of the rod. The oiler assembly housing or retainer member presents a pocket in which the lubricant member is retained, and it has openings therein which are of various radial locations and which receive fasteners or pins for assembling the oiler to the end surface of a cylinder assembly. The lubricant member and the retainer member are arranged to be capable of opening so that they can move over the piston rod and then be positioned endlessly therearound, and the fasteners or pins extend through the retainer member and into openings or other arrangements with the cylinder assembly.

5 Claims, 9 Drawing Figures

ROD OILER ASSEMBLY

This invention relates to a rod oiler assembly, and, more particularly, it relates to an oiler assembly which is attachable to the end of a cylinder assembly to surround the piston rod and thus present a lubricant to the rod.

BACKGROUND OF THE INVENTION

Various and many types of powered equipment or machines utilize cylinder assemblies which have a piston rod which extends and contracts and is thus vulnerable to the elements, such as corrosion and dirt conducive conditions. That is, outdoor working machinery, such as tractors and construction machines, all of which utilize cylinder assemblies with extendable piston rods, are subjected to rust and dirt conditions. In coping with this problem, heretofore it has been a practice and a requirement that the piston rod be treated and lubricated by applying a lubricant thereto and by doing so in a manual or hand operation in hopes of protecting the piston rod from detrimental effects. Such detrimental effects presented by the hostile environment of the natural elements of the atmosphere and the like are particularly severe when the cylinder assembly and the machine on which it is mounted is stored for a long period or is in transit, particularly when it is in overseas transit and is subjected to the air with high salt content which is conducive to promoting rust of the piston rod.

That is, it should be understood that the aforementioned type of equipment or machinery utilizes a piston rod which is of a precision nature and therefore dirt and rust on the rod are detrimental to the action of the cylinder assembly and can jeopardize the life and efficiency of the fluid seal in the cylinder assembly and over which the rod is normally moving. In fact, these piston rods can be chrome plated in order to promote the protection desired, as indicated above, but that is still not adequate for fighting the corrosion and dirt which can accumulate on the rod when it is in a hostile environment, as mentioned. Further, heavy machinery which is mobile, such as bulldozers, loaders, tractors, are normally driven onto a transport ship or other point of storage or shipment, and that requires that the cylinder assembly be actuated and therefore any lubricant or protective coating on the rod will be wiped off by normal use of the cylinder assembly and thus leave the rod exposed for the detrimental effects mentioned. In that situation, it is then necessary to recoat the exposed portion of the rod, and thus more coating material and labor and attention are required.

The present invention provides a rod oiler assembly which is positioned on the cylinder assembly and is thus always available for the required and instant coating of the rod, and thus the oiler assembly of this invention combats the detrimental effects and the hostile environment mentioned above. That is, at the time that the machinery or equipment with the cylinder assembly is to be subjected to the hostile environment of either shipping, storing, adverse working conditions, or whatever, the rod oiler assembly of this invention can be applied to the cylinder assembly and the rod will therefore be automatically and continuously coated with the desired protective coating to combat the hostile conditions. Still further, the rod oiler assembly of this invention can be applied after the entire cylinder assembly is installed and connected in a final and working form, and the oiler assembly is therefore capable of initially moving over the piston rod and then surrounding the piston rod and being connected to the cylinder assembly, all in a ready and easily accomplished manner and in an arrangement where the assembly can be readily and easily removed, if and when such removal is ever desired and no disassembly of the cylinder assembly itself is required.

Still further, the oiler assembly of this invention is arranged so that one retainer member will accommodate several sizes of cylinder assemblies themselves, and this is accomplished by having openings in the retainer member which are at various radial distances for alignment with openings in the cylinder assembly at the various radial distances and by the utilization of pins or plugs which extend through the then aligned openings. Further, the entire oiler assembly can be readily and easily positioned on the cylinder assembly and no special tools or skills are required, and the retainer fasteners can be pins which are simply driven into place with a mallet and which sufficiently securely hold a rod coating-impregnated member in snug position surrounding the piston rod.

In accomplishing the aforementioned, the oiler assembly of this invention is arranged so that it can be moved transversely over the piston rod and the extending end of the rod need not be disassembled or disconnected, and thus the coating-impregnated member is arranged to open up for transverse movement over the rod and to then be in snug endless contact with the circumference of the rod, and the assembly retainer member is arranged in two halves for transverse movement over the rod and then positioning on the cylinder assembly for holding the coating member in the snug contact mentioned.

Accordingly, the present invention provides a rod oiler assembly which coats the piston rod each time the rod moves, and thus the oiler assembly protects the piston rod from the environment and also assures that the fluid seal in the cylinder assembly will not be subjected to and thus damaged by a rod which might otherwise be contaminated due to lack of the needed coating.

Other objects and advantages will become apparent upon reading the following description in light of the accompanying drawings.

BRIEF DESCRIPTION OF THE DRAWINGS

FIG. 5 is a front elevational view of the coating impregnated member of the oiler assembly of this invention.

FIG. 6 is a side elevational view of the member of FIG. 5.

FIG. 7 is a side elevational view of a fastener used in the oiler assembly of this invention.

FIG. 8 is a sectional view taken on the line 8—8 of FIG. 2.

DETAILED DESCRIPTION OF THE PREFERRED EMBODIMENT

Figure 1:
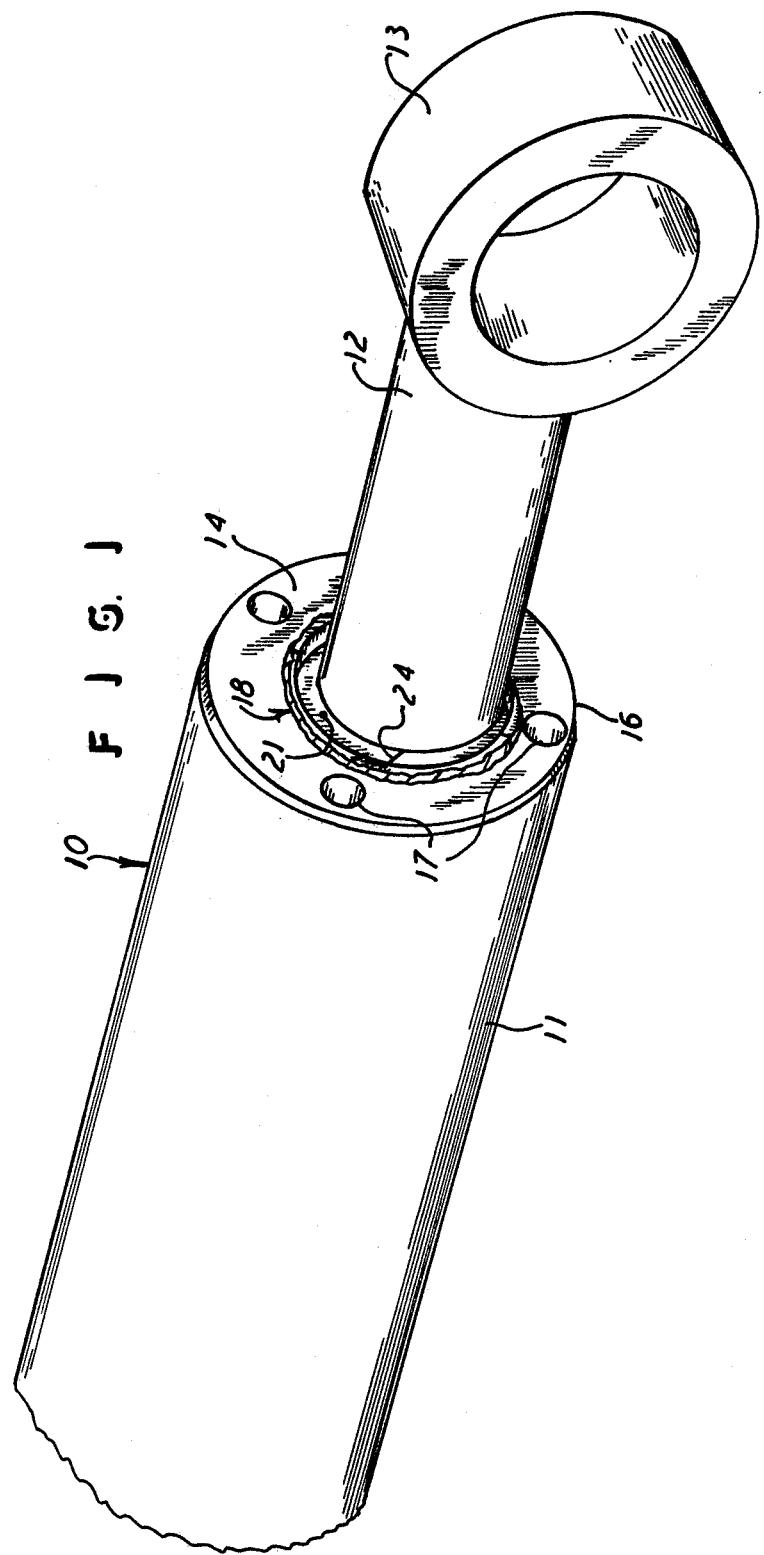
FIG. 1 is a perspective view of a cylinder assembly with the oiler assembly of this invention shown applied thereto but fragmentarily shown.

FIG. 1 shows the cylinder assembly 10 to which the oiler assembly of this invention is applied, and the assembly 10 includes the conventional cylinder 11 and piston rod 12 with an enlarged end or connector 13. It will of course be understood that the assembly 10 may be part of a piece of heavy machinery, as mentioned at the outset thereof and it would be suitably mounted in a fixed and final position in the machinery and the rod 10 would be connected at its extending end 13 and would of course extend in and out relative to the cylinder 11 and thus be exposed to the corrosion, dirt, and like hostile environment. Further, it will be understood that the assembly 10 is on a conventional arrangement and would have the usual fluid connectors, such as hydraulic or pneumatic lines connected thereto, and the usual fluid seals would be disposed within the cylinder 11 at the shown near end thereof and that is immediately behind the planar end surface 14 of the cylinder 11. Therefore, also in the usual arrangement of a cylinder assembly 10, it will be understood that there is a cylinder end gland or plug 16 which can be attached to the cylinder 11, such as by threading therein, and openings or spanner holes 17 are equally spaced around the gland 16 and thus a spanner wrench can engage the holes 17 for the usual assembly and disassembly of the gland 16 relative to the cylinder 11.

FIG. 1 also shows a fragment of the oiler assembly of this invention, and it is designated 18. Thus the oiler assembly is disposed adjacent the cylinder end surface 14 and it surrounds the rod 12, all in a manner shown in the drawings and as explained hereinafter. Therefore, the oiler assembly 18 is positioned and effective for coating the piston rod 12 as the rod moves axially of the cylinder 11 in the usual actuation.

The oiler assembly 18 includes the retainer member generally designated 19 and the coating impregnated member 21 and the fasteners or plugs or pins 22. FIG. 1 shows that the members 19 and 21 are broken away at their outer circumferential portions, to show the surface 14 against which the members 19 and 21 are in abutment. The members 19 and 21 are arranged so that they can be assembled in the position shown in the drawing relative to the cylinder assembly 10 without requiring disassembly of the cylinder assembly 10. That is, the members 19 and 21 can move transversely into position relative to the rod 12 and thus endlessly surround the rod 12, as shown in the drawings. To accomplish this, the retainer member 19 is arranged in two halves or pieces designated 23, and the oiler member 21 is basically an annular member having a slit 24 so that the annular configuration thereof can be opened and slipped transversely over the rod 12 and into its snug surrounding position with the rod 12.

Figure 3:
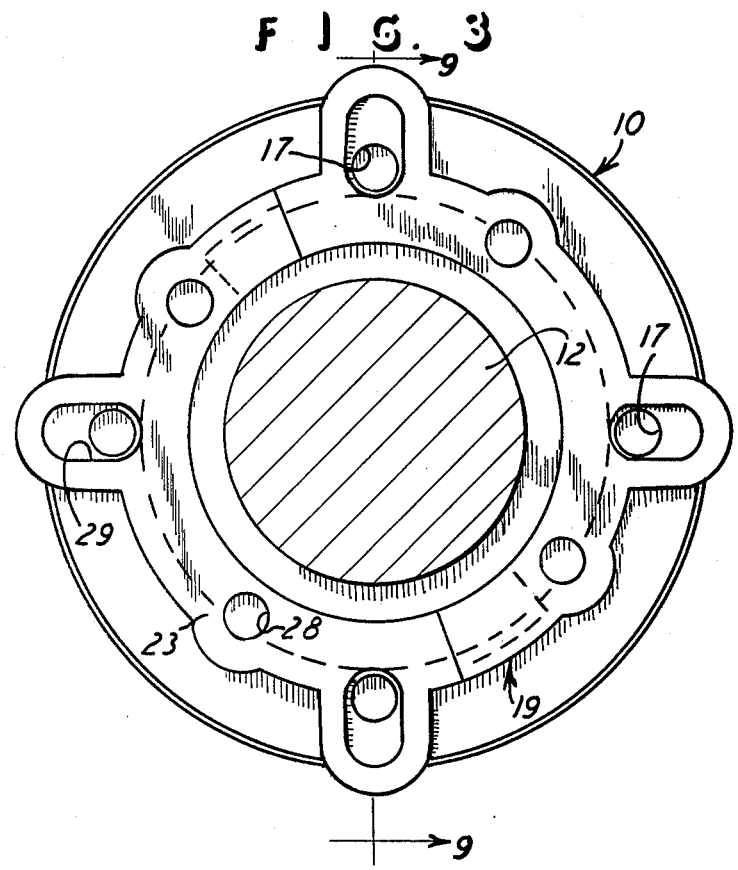
FIG. 3 is an end elevational view of the cylinder assembly and the oiler assembly of this invention applied thereto, with the pins removed.
Figure 9:
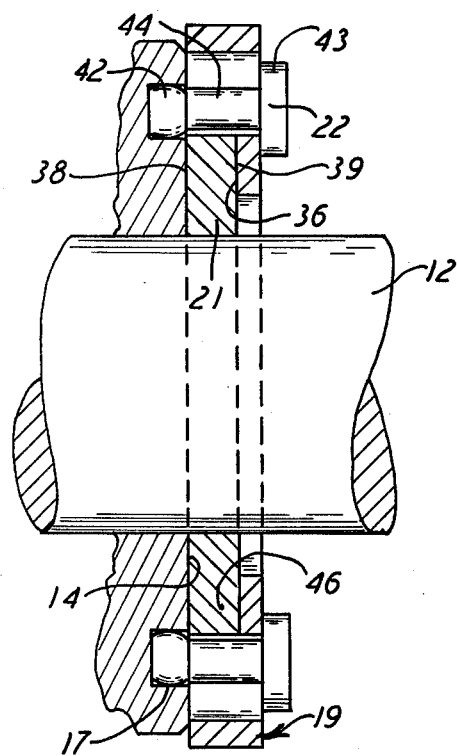
FIG. 9 is a sectional view taken on the line 9—9 of FIG. 3.

The assembly pieces 23 are shown to be in two halves and are identical where they are in halves, and they therefore can readily mount with respect to the cylinder assembly 10 and move together over the rod 12 to their annular and final assembled positions as shown in FIGS. 1, 3, and 9. Thus, the members 23 are arcuate or are semi-circular where they are in two halves, and they interlock by means of locking end portions 26 and 27, with the portion 26 being in the nature of a tang, and with the portion 27 being recessed to snugly receive the tang 26 when the two are moved into the assembled unitary position as shown in FIGS. 1, 3, and 9. Accordingly, the retainer member 19 is arranged in two pieces which can therefore be positioned to surround the rod 12 in their assembled form, without requiring disconnecting of the rod 12 or removal of its enlarged end 13, and the retainer 19 therefore presents an annular configuration in its assembled form of two parts, as mentioned.

Each of the retainer parts 23 include circular openings 28 and elongated openings 29, with the latter being oriented radially relative to the center of the retainer member 19, all for a purpose hereinafter described. Thus, in the assembled form of the two pieces 23, the openings 28 are shown to be four in number and are equally spaced around the retainer member 19, and the same arrangement prevails for the elongated opening 29, as clearly shown in FIG. 3. With that arrangement of the openings 28 and 29 in the retainer member 19, the retainer member openings will align with the spanner or like openings 17 in the cylinder end surface 14, as shown in FIG. 3, depending upon the radial positioning of the opening 17 and of course upon the dimensioning of the retainer member openings 28 and 29. In the arrangement shown in FIG. 3, the four openings 29 are aligned with the cylinder openings 17. However, if the cylinder openings 17 were of a lesser radial distance, then the retainer openings 28 would be utilized for alignment with the cylinder lesser radial openings 17. Further, if the openings 17 were on a greater radial circle, then the outer portions of the elongated openings 29 would be utilized. As such, the openings in the retainer member 19 are arranged in the two sets described which are at different radial distances, and they accommodate the openings 17 of different radial distances in the cylinder end wall 14. Therefore, for a range of sizes of cylinders 11, and that determines the radial locations of the cylinder opening 17, only one configuration of the retainer member 19 is required and that one configuration or size will adapt to the various sizes of cylinder assemblies 10, as mentioned.

Figure 2:
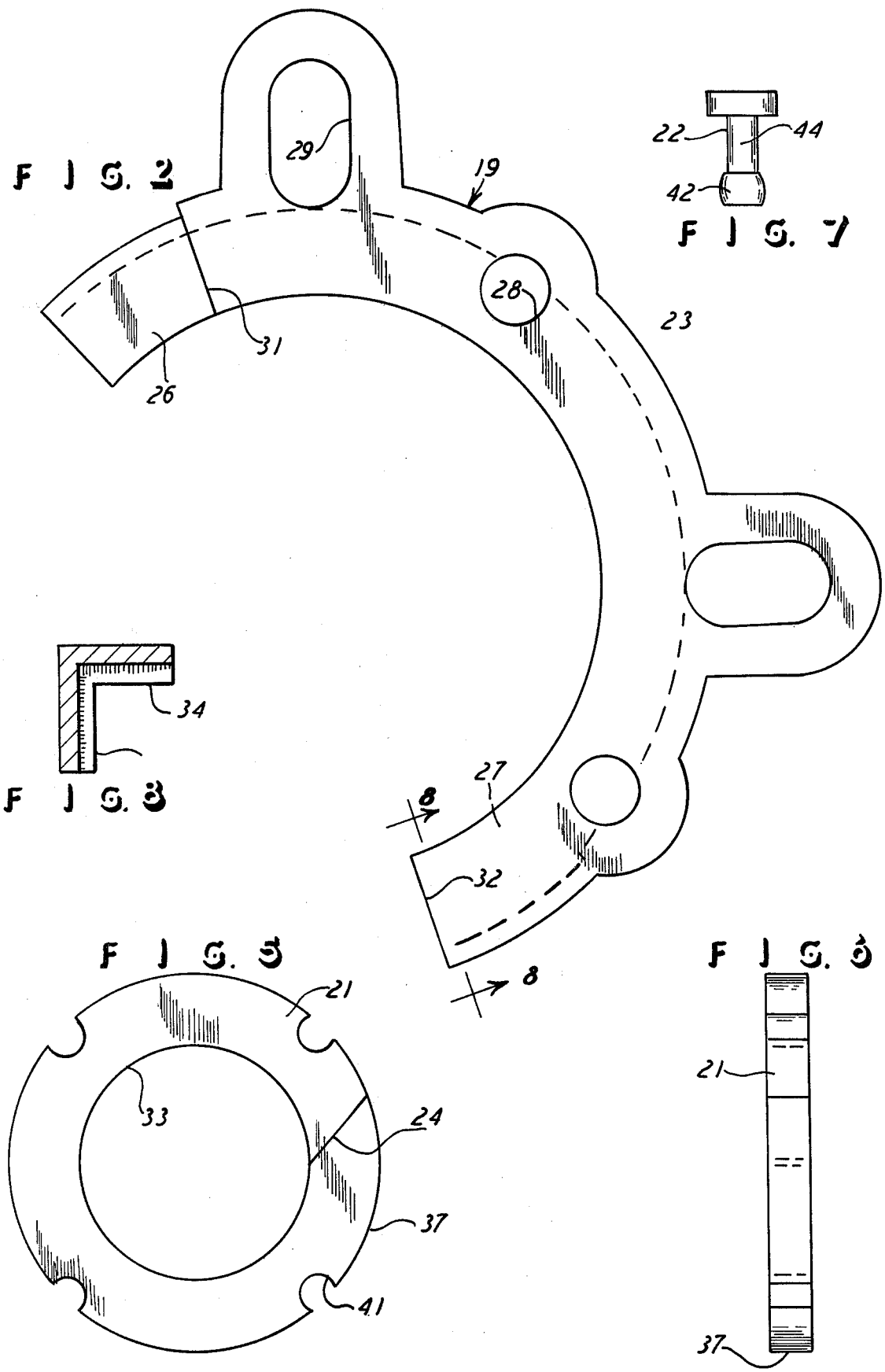
FIG. 2 is a front elevational view of one piece of the oiler assembly of this invention and which is shown in FIG. 1.

Accordingly, in the final assembled form of the retainer member 19, the matching end walls or surfaces 31 and 32 are shown in FIG. 3 and also in FIG. 2 and FIG. 1. As such, the cylinder 11 presents a support member for the rod 12, and the two piece retainer member 19 can be assembled by moving transversely over the rod 12 and then by being disposed adjacent the support member end surface or wall 14.

In the assembled rod oiler assembly of this invention, the oiler or impregnated member 21 is interposed between the retainer member 19 and the surface 14, and the member 21 has an inner circumference 33 which is in snug contact with the circumference of the rod 12. In actual arrangement, the free body or unassembled dimension of the circumference 33 is slightly smaller than the circumference of the rod 12 so that the circumference 33 is in pressing contact with the rod 12 to assure the coating and wiping action desired. It will therefore be understood that the member 21 is impregnated with a lubricant or a coating material, and the member 21 is therefore preferably of an impregnable material such as felt or the like. It is therefore a flexible or pliable material which can be opened along its slit 24 and moved over the rod 12 and then snugly positioned therearound, as mentioned, and the retainer member 19 is of a rigid material so that it will perform its function shown and described herein.

As shown in FIGS. 8 and 9, the retainer member 19 is of a general right angle cross-sectional shape and has a circular wall 34 which extends endlessly around the assembled member 19, and it also has an annular wall 36. FIG. 9 shows that the length of the circular wall 34 is dimensioned according to the thickness of the member 21, and also the outer circumference 37 of the member 21 is dimensioned according to the diameter of the wall 34, all so that the member 21 is snugly disposed within the right-angle cross-sectional configuration of the retainer member 19, and thus the rear wall 38 of the member 21 is pressed against the support surface planar wall 14, and the front face or wall 39 of the member 21 is pressed against the annular surface 36 of the member 19. With that arrangement, the oiler member 21 is completely enclosed by the retainer member 19 and the support wall 14, and it is exposed only toward the piston rod 12 where it is in snug contact therewith, as mentioned. That is, the thickness of the member 21, as shown in FIG. 6, is arranged to be the same as the length of the circular wall 34 of the member 19.

Also, to assure adequate size and secure positioning of the member 21 as mentioned and relative to the rod 12, the member 21 has cut-outs or openings 41 equally spaced around the circumference thereof and to be in the nature of semi-circular openings which therefore align with the two sets of openings 28 and/or 29 of the retainer member 19. With that arrangement, the radial distance of the member 21 from its inner circumference 33 to its outer circumference 37 is of sufficient material or stock so that it can be suitably capable of a quantity of coating or impregnated liquid or paste and so that it can be mechanically retained in its position and not be upset or displaced by the sliding action of the rod on its inner circumference 33.

Figure 4:
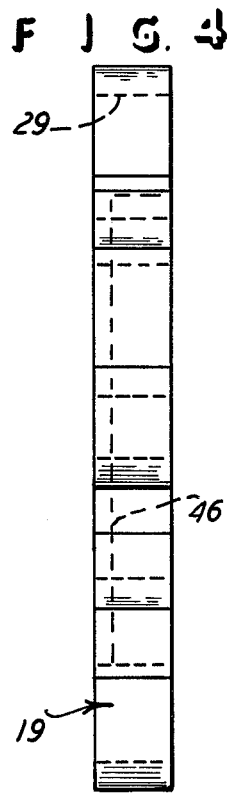
FIG. 4 is a side elevational view of the oiler assembly of FIG. 3.

When the retainer member 19 is positioned with its opposing portions 23 forming an endless circle or the like and when the oiler member 21 is disposed in the stated assembled position, then the members 19 and 21 are moved against the surface 14 and the pins, fasteners, or plugs 22 are extended through the aligned selected openings 28 or 29 and the openings 41 and the openings 17. The plugs 22 are then pressed or hammered into assembled position shown in FIG. 9 where it will be seen that the plugs extend into the planar wall openings 17, and thereby retain the oiler assembly in position and hold it against the forces thereon created by the movement of the rod 22 while the member 21 is in compressed contact with the rod 22, as mentioned. The fasteners 22 may be of a plastic material which is therefore subject to slight deformation and thus snug adaptation of the fasteners 22 relative to the openings 17, as shown, the fastener ends 42 are enlarged and will readily fit through the openings 28, 29, and 41, and the enlarged ends 42 will then be snugly forced into the openings 17. However, the fasteners 22 also have exposed heads 43 which permit the fasteners 22 to be pried out from the assembled position if and when the oiler assembly is to be removed from the support member or cylinder assembly 19. Further, the fasteners 22 therefore have shanks 44 which extend from the heads 22 and to the enlarged ends 42, and those shanks 44 are of a length which is the same as the overall thickness of the retainer member 19, as it is seen in FIG. 4, and thus the fasteners 22 assure that the retainer member 19 will be held in its position against the planar wall 14, or at least assure that the oiler member 21 will be firmly held against the planar wall 14.

Thus, the retainer member 19 presents a pocket 46 which snugly receives the oiler member 21, and the dimensions as to the depth of the pocket 46 and the circumference thereof, as defined by the walls 34 and 36 shown in FIG. 8, are of a size to be the same as the comparable dimensions of the oiler member 21, all for the purposes mentioned.

The retainer member 19 is thus in the nature of a universal member in that its two sets of openings 28 and 29 adapt to the at least three different radial locations for the openings 17. However, the member 21 would be adaptable for some different sizes of rod circumferences, since the member 21 is compressed onto the rod, and also its openings 41 would adapt to some different radial sizes. However, in the preferred and ultimate arrangement, a particular size of member 21 would be utilized with a particular circumference of a rod 12, while only one universal retainer member 19 is required for the different installations or sizes described. The term oiler member includes any member which is capable of either being impregnated or otherwise suspending or holding a lubricant or coating or like treating liquid or compound for presentation to the rod.

What is claimed is:

1. A rod oiler assembly for use with a support member having a planar end surface with a central opening extending therethrough and having holes spaced around said opening and having a rod axially movably mounted on said support member and extending through said central opening, comprising an annular oiler member for snugly endlessly surrounding said rod to be in abutment with said support member end surface, an open-center retainer member for co-axially surrounding said rod and being in abutment with said oiler member on the side of said oiler member away from said support member end surface for pressing said oiler member against said support member end surface, said retainer member having openings extending therethrough and located at different radial distances thereon with respect to the axis of said retainer member to present variable alignments with various said support member holes and thereby have only one of said retainer members accomodate a variety of said support members where said support member holes are located within a range of radial positions, and removable fastener means extending through said retainer member openings and extendable into said support member holes for removable attachment of said retainer member onto said support member end surface.

2. The rod oiler assembly as claimed in claim 1, wherein said retainer member openings are disposed in two sets and with said openings of each of said sets being spaced apart according to the spacing of said support member holes and with each of said sets being at different radial locations, for aligning with said holes in various support members having their said holes at various radial locations.

3. The rod oiler assembly as claimed in claim 1, wherein said oiler member is of a lubricant impregnable material and is flexible and has a slit therein for moving onto said rod when said oiler member is opened up at said slit.

4. The rod oiler assembly as claimed in claim 1, wherein said retainer member includes a pocket which is defined by faces directed toward said support member planar end surface, and said oiler member being disposed in said pocket.

5. The rod oiler assembly as claimed in claim 1, wherein said retainer member openings are elongated in the radial direction on said retainer member, for alignment with said holes in said various support members having their said holes at various radial locations.

* * * * *